Jan. 22, 1963 J. J. WEIER 3,074,763
TUBULAR WHEEL
Filed Nov. 24, 1961 2 Sheets-Sheet 1
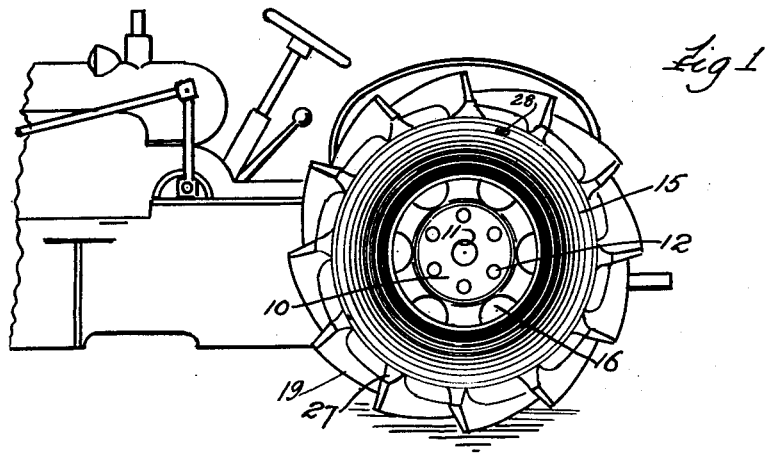
Fig. 1
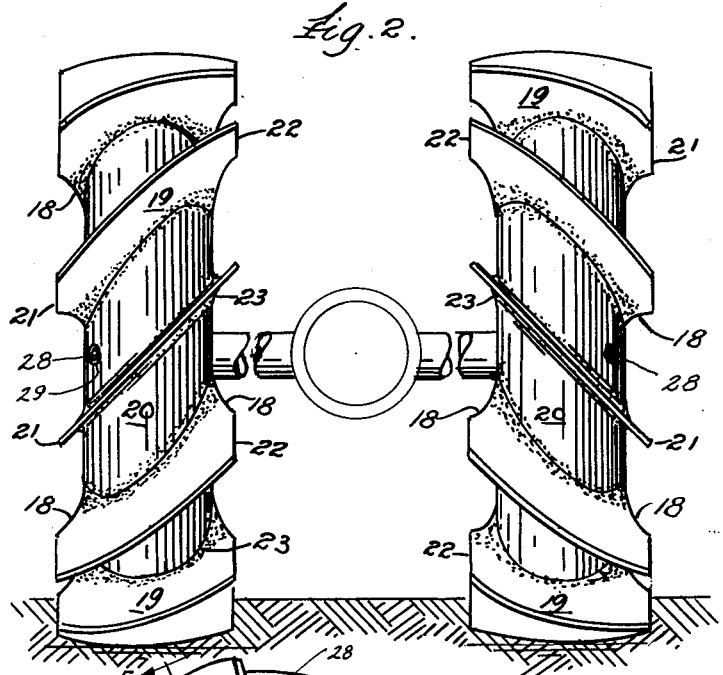
Fig. 2
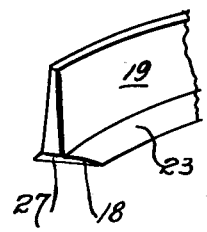
Fig. 8.
Fig. 9
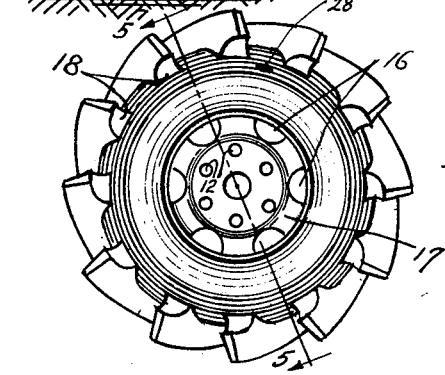
Fig. 3
Inventor:
Jacob J. Weier

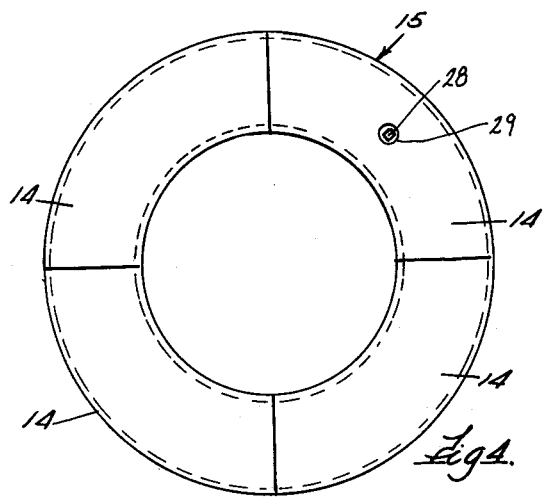
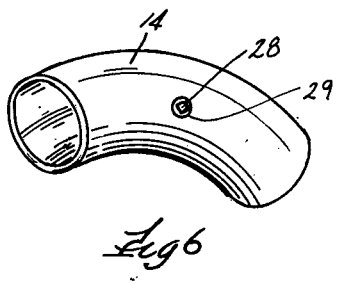
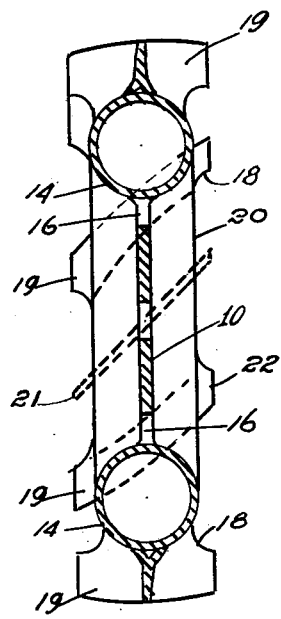
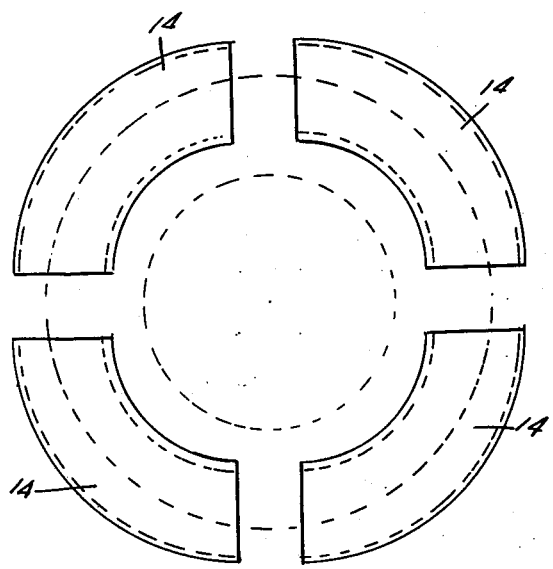

United States Patent Office 3,074,763
Patented Jan. 22, 1963

3,074,763
TUBULAR WHEEL
Jacob J. Weier, 10611 S. Sawyer Ave., Chicago 55, Ill.
Filed Nov. 24, 1961, Ser. No. 154,710
8 Claims. (Cl. 301—43)

The present invention relates to improvements in traction devices and, more particularly, to demountable wheels having hollow metal rims with obliquely extending metal cleats, the metal cleats spaced parallel with each other and welded upon the road surface portion of the hollow metal rims, and having their free end portions extending a short distance beyond each side of the demountable wheels.

The main object of the invention resides in the provision of a demountable wheel of this character, made of any suitable material for use with motor vehicles, such as trucks, farm tractors or jeeps, which may be driven on soft or muddy ground.

Another object of the invention resides in providing a hollow, tubular rim or felly secured to a disc and forming a rigid wheel; the rim being a doughnut shaped torus.

Another object of this invention is to provide a traction device which comprises a metal disc wheel with an integral hollow metal rim of circular transverse cross-section, the rim being tubular and curved circumferentially and provided on its outer periphery with parallel, spaced, oblique traction members integrally welded thereto with the free ends thereof extending outwardly beyond each side of the rim and wheel.

More specifically the object of this invention is to provide demountable steel wheels with hollow rims of transverse circular shape which can be used to supplant the ordinary disk wheels with pneumatic tires thereon, where supplementary traction is needed when a tractor type vehicle is used on soft or muddy ground.

According to the general features of this invention there is provided in a wheel structure a metal wheel disc, a hollow tubular road surface rim portion welded to the periphery of the wheel disc, the road surface portion of the rim being curved circumferentially and circular transversely, the entire structure being a rigid single unit and demountable on suitable vehicle driving elements arranged upon the end portions of the axles thereof.

It is known to make hollow wheel rims of various shapes in cross-section, such rims consisting of two or more parts mutually abutting adjacent edge portions, has been very costly, and when metal cleats are welded to any shape of rim other than circular in transverse cross-section, internal stresses are set up and the rim is no longer true and in one plane as desired. These difficulties have been overcome here by assembling four identical 90-degree elbows in the outline of a perfect circle and welding them together at their adjacent proximal ends, thereby forming a hollow tubular ring aligned in a single plane and true circumferentially. A tubular ring, circular in transverse cross-section will withstand any and all internal strains and stresses and permit metal cleats to be welded thereto without damage. A perfect annular, tubular ring type wheel rim is provided suitable for the adaptation of metal cleats thereto, arranged transversely and/or angularly therewith, and suitable to be secured to a disc means to provide the most desirable rigid wheel structure embodying a doughnut shaped torus.

A still further object of this invention is to provide means for eliminating packing of soil between the cleats and to provide further means for eliminating the side slipping or skidding of the wheels when a vehicle is being operated on wet soil or on a hillside.

It is likewise an object to construct a tractor wheel which, instead of packing the soil, will serve to break it up due to the slicing action of the cleats arranged at an angle of 45-degrees upon the periphery of the rim.

It has been found in the past that a simple traction increasing expedient is the increasing of the weight of the rear wheels of a tractor by adding weights in the form of iron weights, or by the filling of tires with water. It is therefore an important object of this invention to provide a hollow wheel rim made of metal or any suitable material, having a valve and valve closing means whereby fluids can be added or removed therefrom, such as liquids, and powders, without damage thereto.

And still a further object of this invention is to provide a wheel structure with strong, durable cleats which are formed as an inverted Y in cross-section forming an inverted V shape groove in its lower edge portion for giving dual welding surfaces therewith.

A still further object of this invention is to provide a traction device that is adapted to quantity production and inexpensive, and which will have longer life and usefullness than ordinary wheels of similar character.

These and further objects of my invention will be set forth in the following specification, reference being had to the accompanying drawings, and the novel means to which said objects are effectuated will be definitely pointed out in the claims.

In the drawings:

FIGURE 1 is a fragmentary elevational view of a rear portion of a conventional farm tractor provided with the tractor wheel which is subject of this invention;

FIGURE 2 is a rear elevation of a pair of tractor wheels mounted on a common axle, parts of axle removed, as shown in FIGURE 1;

FIGURE 3 is a side elevation of the tractor wheel shown in FIGURES 1 and 2;

FIGURE 4 is a side elevation of the hollow, tubular rim of the wheel of this invention before the cleats and the discs are secured thereto;

FIGURE 5 is a transverse sectional view taken along line 5—5 of FIGURE 3;

FIGURE 6 is a perspective view of a 90-degree tubular elbow;

FIGURE 7 is an exploded side elevational view of four hollow 90-degree elbows forming the invention shown by FIGURE 4;

FIGURE 8 is a fragmentary perspective end view of a cleat forming a part of this invention; and FIGURE 9 is a fragmentary vertical sectional perspective view of a cleat forming a part of this invention.

Off-the-highway vehicles of the usual type use large pneumatic tires for the two-fold purpose of carrying the load and providing a large supporting area for operation where ground supporting conditions are poor, such as in sand and mud. With the increasing use of greater power for driving such vehicles, it becomes necessary to increase the traction effect of such pneumatic tires in order to handle the load involved. These improved tires are very expensive and become useless after a period of time due to intervals of time throughout the year when they are not in use. Once the rubber cleats are worn off from the road surface of the tire, or when mud collects between the cleats on the tires, the tractive effort is lost and the vehicle equipped with the tires becomes mired in sand or mud. In order to overcome the defects noted above by ordinary wheels with rubber tires, applicant has invented a novel one-piece metallic traction device, a demountable disc wheel is used, an endless annular tubular rim, circular in cross-section made of suitable material is welded or otherwise integrally secured along its inner circular supporting surface to the periphery of the disc wheel, the cicular tubular ring portion of the wheel having the appearance of and taking the place of a pneumatic tire on an ordinary wheel, and then metallic cleats are welded obliquely across the road surface portion of the circular section. Usually twelve cleats are arranged, each at an angle of 45-degrees on each hollow tubular rim, the cleats are so spaced that one cleat will terminate at one side of the rim and the adjacent cleat will start on the opposite side of the rim whereby one cleat has a portion thereof in the soil at all times when in use. The cleats are of sufficient length to extend radially outward from the vertical greatest circumference at the center for a distance of four inches and for a distance of seven inches at the sides. The cleats actually have their opposite ends arranged to provide a continuous ground-engaging portion which eliminates vibration and jolting of the tractor or other machine mounted on wheels of this type. The cleats extend into the earth and prevents side slipping of the tractor on a hillside and further serves to prevent locking of roots or the like article between the cleats. The cleats extend beyond each side of the rim two inches and are formed in reverse, those for the left side wheel extending forwardly and inwardly as well as those on the right side thereof where they extend inwardly and forwardly, providing a maximum anti-slipping surface to the soil allowing the tractor to travel in a straight path. The cleats are shown by FIGURE 2 to have sufficient length to extend radially outward from the greatest circumference, and the side wall portions, of said circular, tubular, ring type section to gain supplementary gripping action with the ground when in contact, or embedded therewith. Most traction devices are difficult to apply upon a vehicle wheel, however, the traction wheel of this invention is less difficult to install; it takes only the usual simple procedure of elevating the vehicle from the ground with enough clearance whereby the common wheel can be removed and the improved wheel embodying this tubular wheel invention can be applied with the greatest of ease.

The manner of accomplishing the foregoing objects, as well as further objects and advantages, will be made manifest in the following description:

The traction device of this invention comprises a disc wheel 10 with a central opening 11, and a plurality of bolt openings 12 equally spaced circumferentially and arranged a short distance outwardly from the central opening 11, the arrangement of the bolt openings 12 being such that the improved traction device can be mounted upon the standard bolts assembled with the standard driving hub members secured on the end portions of the driving axles of the vehicle. The wheel rim 15 includes four ninety degree elbows 14 arranged in a circle and welded together at the proximal ends thereof, forming an endless hollow tubular annular ring circular in cross-section; as shown by FIGURE 4. The disc wheel 10 is formed with a plurality of radially arranged openings 16 adjacent its periphery, the portion of the disc wheel between the openings 16 forming radiating spokes 17 which are each welded to the annural rim of circular cross-section, along the inner circular supporting surface, or smallest circumference thereof and all the spokes in a common plane. A plurality of cleats 19, usually made of iron, or the like, are integrally welded to the road surface portion 20 of the annular rim 15, thereby eliminating expensive machining processes usually required on cast and/or forged traction devices. The four hollow elbows 14, are so shaped and clearly shown by FIGURE 7, so they can be welded together to form the annular tubular rim shown by FIGURE 4, with plug 28 and inlet 29.

One of the novel features of this invention resides in the provision of parallel, spaced, oblique metal cleats 19 each integrally welded to the convex surface of the hollow annular rim 15. The cleats 19 extend diagonally across the road surface 20 of the rim 15 and have their end portions 21 and 22 extend two inches beyond each side of the rim, the ends 21 and 22 of the cleats being in substantially longitudinal alignment with corresponding ends on the same side of the disc wheel 10. As shown by FIGURE 3 of the drawing, the annular wheel rim 15 comprises twelve diagonal, parallel metal cleats 19. The cleats are characterized by being of concave-convex curvature longitudinally, the radius of said longitudinal curvature being constant. The cleats 19 are shaped as an inverted Y in cross-section and constructed of hard metal such as special iron, steel. The lower portion 23 of each cleat forms an inverted V shaped cavity 24, shown by FIGURE 9, and two outwardly and angularly formed edge portions 25 and 26 suitable for welding to the road surface of the rims 15; whereby each cleat is integrally welded to the rim along two parallel edges thereby giving dual strength and rigidity to the cleats. Each end of each cleat has a curved end portion 18 and is closed by a plate 27 welded thereto to keep mud, water, sand and the like from entering the cavity 24 of the cleat when in use, as shown by FIGURE 8. The cleats 19 are each a continuous, unbroken blade extending beyond each side of the annular hollow rim at approximately forty-five degrees relative to the longitudinal axis of the rim. The far end 22 of each cleat 19 terminating at one side of the rim is in transverse alignment with the near end 21 of the second following cleat 19, whereby a smooth substantially continuous twin road contacting surface is provided as the weight of the load is transferred from two adjacent cleats to the next two adjacent cleats as the wheel turns. The cleats 19 are free of any longitudinal flanges whereby the cleats actually cut into the ground, not pressed all at one instant, and the ground, or soil, actually passes transversely between the cleats. No dirt ever clings to the rim 15 between the cleats 19, as is clearly shown by FIGURE 2. The metal area upon the convex exterior surface between the cleats is a closed, smooth surface so no mud ever clings thereto.

The novel traction device shown by FIGURE 3, shows the wheel demountable by applying it over the ordinary bolts extending from the hub-cap member attached on the end of the drive axles.

In the manufacture of my improved traction device the annular tubular wheel rim is formed from a plurality of elbows of predetermined size. The elbows are welded, or brazed, or otherwise secured to each other, making a continuous annular hollow rim. The cleats can also be secured to the hollow rim by welding, or brazing or the like to make the traction device an integral rigid unit. In this process of assembly of the various parts, the fibers of the metal parts are preserved, they are not twisted; therefore the welding of the cleats and rim to the periphery of the disc does not distort the entire device, it remains in one plane. The tubular rim, circular in transverse cross-section provides greater strength than any other form and gives a light weight unit within which ballast of any type can be used. From the above description it is evident that my improved traction device is a strong demountable wheel type unit.

While I have described one form of my invention, I do not wish to be limited to the particular form shown and described, as it is apparent to those skilled in the art that many modifications therein may be made without departing from the scope of the invention.

I claim:

1. A device for improving traction of a motor vehicle, the traction device comprising an all metal, non-resilient demountable wheel, said wheel comprising a metallic disc wheel member with an outer peripheral edge and a unitary metallic annular hollow channel felly section, said felly section being circular in cross-section, said felly section having an external circumferential wheel surface and a smaller external circumferential supporting surface, the outer peripheral edge of said disc wheel member integrally welded to the smaller external circumferential supporting surface of said felly section whereby said felly section and said disc wheel member become a unitary rigid unit, the interior of said felly section providing a single annular cavity to provide a water ballast compartment suitable for a desired quantity of water ballast, said felly section having a plurality of straight, diagonal, parallel, spaced metal cleats rigidly welded to the external circumferential wheel surface, said cleats being of concavo-convex curvature longitudinally, the longitudinal length of each of said cleats being greater than the transverse width of said felly section, and said cleats extending angularly and outwardly beyond each side of said felly section.

2. The construction according to claim 1, wherein said disc wheel member is a flat disc member with a plurality of outwardly projecting spokes with terminal end edge portions welded to said smaller external circumferential supporting surface of said annular hollow channel felly section, said flat disc member having a single large central opening for receiving a portion of the axle driving member of the vehicle thereof and also having a plurality of openings radially spaced from said central opening for receiving the mounting lugs of the vehicle thereof.

3. A device for importing traction of greater effectiveness to a motor vehicle, the traction device comprising a unitary demountable metal wheel, said demountable wheel comprising a unitary disc wheel member and a unitary annular hollow rim circular in cross-section rigidly welded together, said disc wheel member having a single large central opening for receiving a portion of the axle driving member of the vehicle therein and a plurality of small openings radially and outwardly spaced from said central opening for receiving the mounting bolts of the vehicle therein, said rim having an external circumferential wheel surface and a smaller external circumferential supporting surface, said disc wheel member having a plurality of spoke-like elements projecting radially outwardly therefrom with end edge portions, said rim being a unitary, endless, hollow tubular annular metal section, the end edge portion of said spoke-like elements being welded to the said smaller external circumferential supporting surface of said rim effecting one rigid unit, said annular tubular rim having a plurality of substantially straight, diagonal, parallel, spaced metal cleats welded to the external circumferential supporting surface thereof, said cleats being of concavo-convex curvature longitudinally, the longitudinal length of each of said cleats being greater than the transverse width of said tubular annular rim, and said cleats extending angularly and outwardly beyond each side of said tubular annular rim.

4. The combination according to claim 3, wherein said cleats are each welded to said tubular rim, each cleat being formed as an inverted Y in cross-section, the longitudinal median of each of said cleats disposed in a radial plane of the wheel arranged at 45 degrees with that of its axis, and each of said cleats conforming in contour to the transverse curvature of the external surface portion of the tubular annular rim.

5. The combination according to claim 4, wherein said metal cleats are each formed as an inverted Y in cross-section providing an inverted V-shaped internal groove and with two depending contact edge members, said groove being sealed at each end by closure means, and said contact edge members effecting dual welding surfaces concaved longitudinally with said tubular, annular metal rim.

6. The device according to claim 1, wherein each of said cleats are formed as an inverted Y in cross-section providing an internal inverted V shaped groove with two depending contact edge members effecting dual securing surfaces of concave curvature longitudinally with said annular hollow channel felly section.

7. The device according to claim 1, wherein said hollow channel felly section is provided with a water opening and closure means for said opening, and the single cavity formed by the interior of said tubular annular channel section being substantially filled with water contacting the interior surface of the channel section effecting increased weight thereto.

8. The traction device according to claim 3, wherein said annular metal element is provided for a plug type valve opening and a plug type valve closing means, the inner area of said annular metal element forming a single cavity to provide a fluid ballast compartment, and contains a suitable quantity of water ballast therein.

References Cited in the file of this patent

UNITED STATES PATENTS

| | | |
|---|---|---|
| 399,354 | Thomas | Mar. 12, 1889 |
| 494,947 | Wynn | Apr. 4, 1893 |
| 1,376,394 | Boker | May 3, 1921 |
| 1,491,667 | Brandt et al. | Apr. 22, 1924 |
| 2,106,135 | Henry | Jan. 18, 1938 |
| 3,008,506 | Hicks | Nov. 14, 1961 |

FOREIGN PATENTS

| | | |
|---|---|---|
| 17,106 | Australia | Oct. 22, 1929 |
| 879,525 | Great Britain | Oct. 11, 1961 |